April 16, 1935.  C. DOERING  1,997,999
CONTINUOUS BUTTER PRODUCER
Filed Aug. 22, 1932
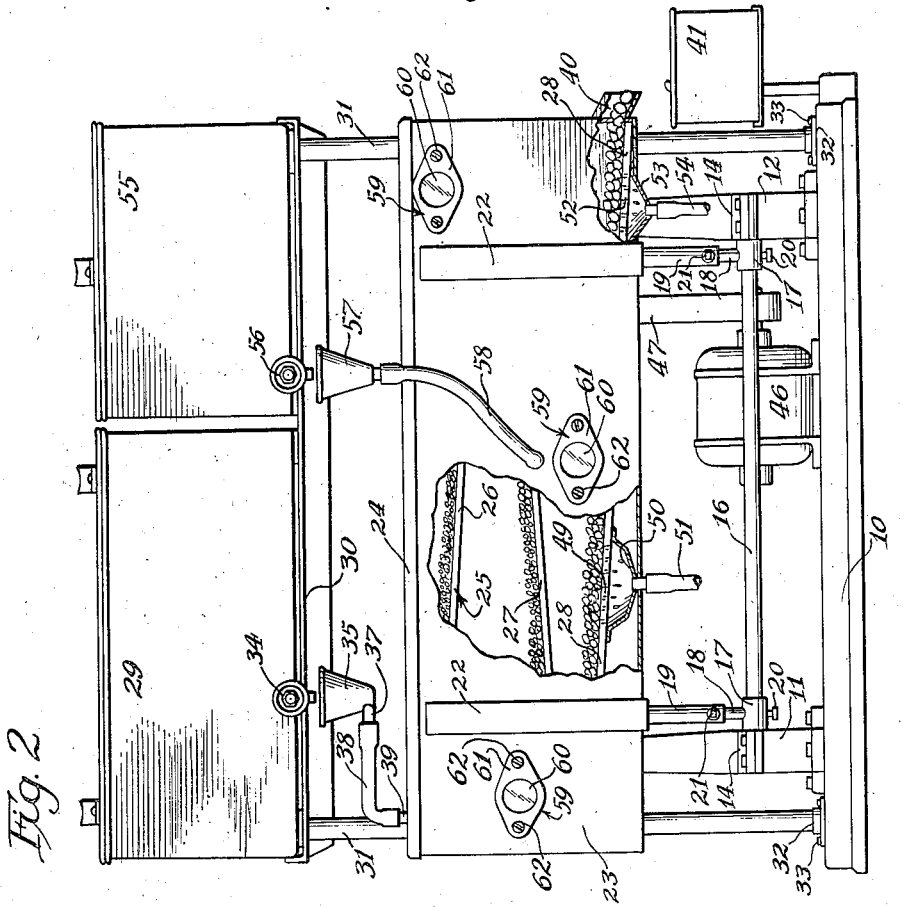
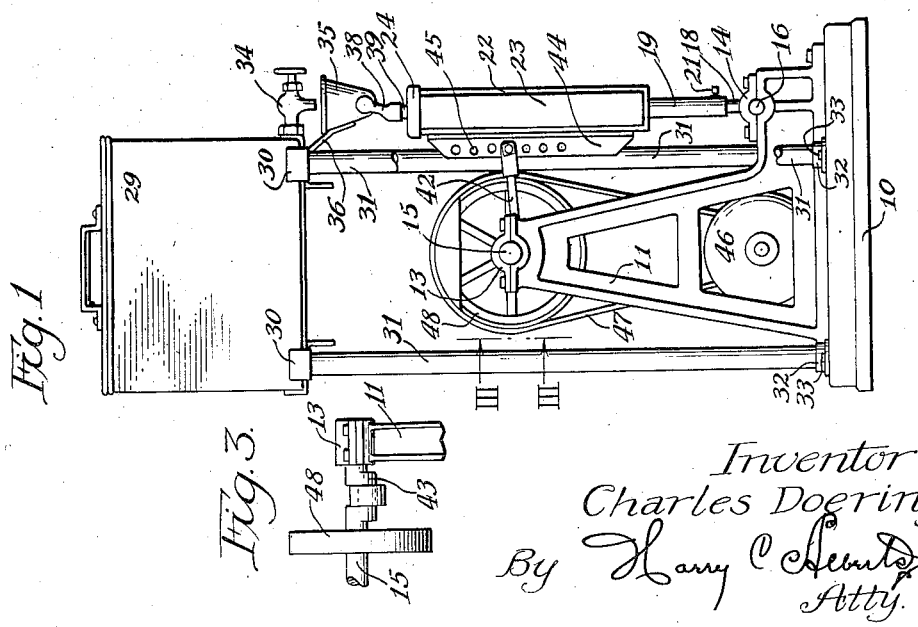
Inventor:
Charles Doering
By Harry C. Schutz
Atty.

Patented Apr. 16, 1935

1,997,999

UNITED STATES PATENT OFFICE 1,997,999

CONTINUOUS BUTTER PRODUCER

Charles Doering, Chicago, Ill.

Application August 22, 1932, Serial No. 629,829

6 Claims. (Cl. 259—2)

This invention relates to a producer for dairy products and more particularly to continuous butter producers, although the teachings thereof may be employed with equal advantage for other purposes.

It contemplates more especially the provision of a simple and effective device for producing dairy products without entailing much labor or requiring interrupted handling in order to render such available for the market.

Numerous types of butter producers have been heretofore proposed, but these have not proven especially adoptable in continuous processing of dairy products which require utmost sanitation and varied processing in order to render such ultimately available for the market. In the case of butter, the cream must be handled and agitated; thereafter the butter milk must be withdrawn and separated from the resulting product, and then cleansing must be effected to the end of producing a product suitable for marketing. These varied steps usually entail handling and interrupted processing which involves a great deal of time and precludes the production of dairy products with utmost sanitation.

One object of the present invention is to simplify the construction and improve the operation of the device of the character mentioned.

Another object is to provide improved means for producing dairy products such as butter in a new and novel manner without interrupted handling.

Still another object is to apply the vibratory principle to a butter producing device so as to afford conversion of liquid dairy products into solids in a continuity of operations.

A further object is to provide means for vibrating dairy substances along a predetermined path to effect the progressive conversion thereto into butter or other solid edibles.

A still further object is to provide novel means for vibrating dairy liquids for the conversion thereof into solid edibles without entailing much labor, time or interrupted handling thereof.

Still a further object is to direct dairy liquids along a predetermined path for progressive conversion into edible solids responsive to the subjection thereof to vibration with progressive cleansing and by-product withdrawal in a continuity of interrupted operations.

Other objects and advantages will appear from the following description of an illustrative embodiment of the present invention.

In the drawing:

Figure 1 is an end view in elevation of a device embodying features of the present invention.

Figure 2 is a side view of the device disclosed in Figure 1, parts thereof being removed to clarify the showing.

Figure 3 is a fragmentary view of the crank mechanism viewed substantially from line III—III of Figure 1.

The structure selected for illustration comprises a substantially rectangular base 10 which supports standards 11 and 12 transversely and proximate to the extremity thereof. The standards 11 are bolted or otherwise attached to the base 10, and these carry split bearings 13 and 14 at different elevations and in horizontally spaced relation, the bearing 14 being more proximate to the base 10 for reasons which will appear more fully hereinafter.

The horizontally aligned bearings in the standards 11 and 12 carry a crank shaft 15 which is journalled for rotation therein. A rocker shaft 16 is journalled in the bearings 14 to support the bushings 17 proximate to the standards 11 and 12, the bushings 17 having vertically extending rods 18 formed integral or otherwise therewith to telescopically receive tubular members 19 thereover. Fasteners such as set screws 20 threadedly engage the bushing 17 for contact with the rocker shaft 16 so as to establish a rigid connection therebetween as well as afford relative adjustability. Set screws 21 extend through the tubular members 19 for engagement with the bushing rods 18 so as to regulate the vertical relation therebetween, it being possible to elevate or lower the tubular members 19 relative to the rods 18 as commercial practice may dictate or require in order to procure the desired adjustment for reasons which will appear more fully hereinafter.

The tubular members 19 terminate in U-shaped brackets 22 designed to receive a vertically elongated box member or casing 23 which rests therein for support by the rocker shaft 16. The casing 23 is provided with a top closure 24 detachably associated therewith, there being a runway in the casing 23 to define a circuitous path for the substances discharged thereto. The runway 25 comprises in this instance, a series of alternately inclined flat members 26, 27 and 28 of substantially rectangular configuration to effect the traverse of the substances from one to the other until the bottom of the casing 23 is reached. The top member 26 receives a liquid substance such as cream from a tank 29 which is supported by a bracket 30 attached to the standards 31, The standards 31 terminate in flanges 32 to enable the attachment thereof to the base 10 by means of fasteners 33. By so doing the tank 29 is elevated substantially above the casing 23, and the cream is allowed to pass therefrom through a valve 34 into a funnel 35 supported by the bracket 30 by virtue of a plate 36. The funnel 35 has a discharge pipe 37 leading to a hose 38 which establishes communication between the funnel 35 and a pipe 39 attached to the top casing closure 24. The cream from the tank 29 flows responsive to the urge of gravity through the top closure 24 proximate to one end thereof for lodgment on the runway board 26 near the highest elevated end thereof. The flow of the cream is regulated by means of the valve 34, and such is guided down the runway 26 for deposit on the runway 27 and subsequently to the runway 28 which communicates with a discharge spout 40 provided in the casing 23 near the lowermost edge thereof. The spout 40 may be provided with a gate valve of any suitable construction so as to regulate the flow from the casing 23 to a receptacle or funnel 41 which may constitute a part of another processing machine such as a butter print device.

During the passage of the liquid substances such as cream along the runway 25, the entire casing 23 is vibrated or oscillated by means of connecting rods 42 connected intermediate the cranks 43 and the casing 23. The casing supports 22 are, in this instance, provided with angle brackets 44 to enable the convenient attachment of the connecting rods 42 thereto. In the present embodiment, the angle brackets 44 are provided with a plurality of apertures 45 which afford an adjustable connection of the rods 42 thereto so that the latter may be disposed substantially horizontally, irrespective of the vertical adjustment of the casing 23 owing to the telescopic support of the tubular member 19 relative to the rocking shaft mounts 18. A variation in the elevation of the casing 23 will vary the extent of oscillation or degree of vibration depending upon the dictates and requirements of commercial practice, and this adjustment is afforded by the yielding hose 38 so that the tank 29 need not be correspondingly displaced.

Rotation is imparted to the crank shaft 15 by means of an electric motor 46 mounted on the base 10, there being a belt 47 which connects the motor armature with a fly-wheel 48 mounted on the shaft 15. Any number or fly-wheels 48 may be attached to the shaft 15 to stabilize the vibration of the casing 23 and to render the cycle of operation of the moving parts more smoothly conducive to continued maintenance. The extent of vibration of the casing 23 determines the degree of conversion of the liquid flowing from the tank 29 to the runway 25. It will be apparent that this vibration will progressively convert the liquid, in this instance, to butter particles and the residue liquid therefrom such as buttermilk may be drained or withdrawn from the path of movement without interruption thereto. This is accomplished by providing a perforated area 49 in the flat member 28 so that the remaining liquid may be withdrawn therefrom responsive to the passage thereover. A disc shaped funnel 50 is secured to the underside of the member 28 to surround the perforated regions 49 thereof so that the liquid residue may be drawn off and conveyed by means of a pipe 51 to any suitable supply tank.

In order to cleanse the converting solids prior to the discharge from the casing 23, another perforated region 52 is provided in a flat member 28 proximate to the extreme discharge end thereof. Another funnel-shaped member 53 is attached to the underside of the flat member 28 to enclose the perforated region 52 thereof, and all liquids on the runway intermediate the perforated region 49 and the lowermost end of the casing 23, are withdrawn through the tube or pipe 54. Cleansing is enabled by resort to a water-spray which is supplied to the casing 23 above the runway board 28 and intermediate the perforated regions 49 and 52 thereof. To this end, a water supply tank 55 may be provided on the same bracket 30 which serves as a support for the cream supply tank 29. A valve 56 therein controls the passage to a funnel 57 which has a yieldable pipe such as a hose 58 in communication with the side wall of the casing 23 between the runway boards 27 and 28. Thus, a water spray may be selectively furnished from the tank 55 to cover the converted solids such as butter after the liquid residue such as buttermilk has been withdrawn therefrom to the discharge funnel 50. The cleansing fluid is withdrawn from the path of travel prior to the discharge of the converted solids such as butter from the casing 23 through the perforated region 52 as described supra.

In order to enable the observation of the conversion process interiorly of the casing 23, a plurality of peep indicators, in this instance three, are provided in the side wall of the casing 23. The peep indicators 59 comprise, in this instance, a circular transparent disc 60 preferably made from glass which is hermetically sealed and mounted in flanges 61 for attachment to the side wall of the casing 23 by virtue of fasteners 62. The indicator 59 is preferably provided at crucial positions in the path of travel so as to enable the frequent and convenient observation of the substances as they are progressively converted. Thus the attendant may be guided in the operation and oscillatory movement of the casing 23, since the degree of vibration or oscillation determines the rapidity of conversion of the liquid to produce edible solids such as butter. The extent of oscillation or vibration is variable by changing the height of the casing 23 relative to the rocker shaft 16, thereby necessitating the change in the connection of the crank rod 42 with the casing bracket 44. This adjustment affords the desired variation for treating different substances or the same substances of different grades and quality. With the arrangement of parts above described it is apparent that a new and novel method of producing dairy substances has been provided in a continuity of operations without necessitating or requiring interrupted handling or entailing much labor or time of the attendant. The materials are not handled during the processing thereof and this is conducive of the highest degree of sanitation.

Various changes may be made in the embodiment of the invention herein specifically described without departing from or sacrificing any of the advantages of the invention as defined in the appended claims.

I claim:

1. In a device of the character described, the combination with a source of fluid supply, of means for guiding fluid from said source along a circuitous path responsive to the influence of gravity, means for vibrating said guide means for partial conversion of said fluid to solid particles, means for draining the residue liquid from said path during the traverse of the solid particles, and means for guiding the discharge of said solid particles.

2. In a device of the character described, the combination with a source of fluid supply, of means for guiding fluid from said source along a circuitous path responsive to the influence of gravity, means for vibrating said guide means for partial conversion of said fluid to solid particles, means for draining the residue liquid from said path during the traverse of the solid particles, means for cleansing the solid particles during the traverse thereof, and means for guiding the discharge of said solid particles.

3. In a device of the character described, the combination with a source of fluid supply, of means for guiding fluid from said source along a circuitous path responsive to the influence of gravity, means for vibrating said guide means for partial conversion of said fluid to solid particles, means for draining the residue liquid from said path during the traverse of the solid particles, means for cleansing the solid particles during the traverse thereof, means for draining the cleansing fluid from said path, and means for guiding the discharge of said solid particles.

4. In a device of the character described, the combination with a source of fluid supply, of means for guiding fluid from said source along a circuitous path responsive to the influence of gravity, means for vibrating said guide means for partial conversion of said fluid to solid particles, means for draining the residue liquid from said path during the traverse of the solid particles, means for cleansing the solid particles during the traverse thereof, means for draining the cleansing fluid from said path, means for guiding the discharge of said solid particles, and means for varying the degree of vibration of said guide means.

5. In a food producer of the character described, the combination with a source of edible fluid supply, of means for guiding the fluid from said source along a predetermined path, means for vibrating said guide means for partial conversion of said fluid to solid edible particles, means for draining the residue liquid from said path during the traverse of the solid edible particles, means for cleansing said solid edible particles during the traverse thereof, means for varying the degree of vibration of said guide means, and means for guiding the discharge of said solid edible particles.

6. In a food producer of the character described, the combination with a source of edible fluid supply, of an inclined runway for guiding the liquid along a predetermined path responsive to the urge of gravity, means for vibrating said runway for the progressive partial conversion of said liquid to solid edible particles, means for draining the residue liquid, means for directing a source of cleansing fluid supply to said runway, means for draining said cleansing fluid from said runway prior to the discharge of the solid edible particles therefrom, and means for varying the degree of vibration of said runway.

CHARLES DOERING.